US008649033B2

(12) United States Patent
Agnetta et al.

(10) Patent No.: US 8,649,033 B2
(45) Date of Patent: Feb. 11, 2014

(54) SYSTEMS AND METHOD FOR MONITORING CONSUMABLE SUPPLY LEVELS IN ONE OR MORE PRINTERS

(75) Inventors: Karen Agnetta, Boise, ID (US);
Brennen W. Stollfus, Boise, ID (US);
James E. Clough, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 2358 days.

(21) Appl. No.: 11/541,118

(22) Filed: Sep. 29, 2006

(65) Prior Publication Data

US 2008/0079989 A1 Apr. 3, 2008

(51) Int. Cl.
*G06K 15/00* (2006.01)

(52) U.S. Cl.
USPC ......... 358/1.14; 358/1.15; 358/501; 358/401; 358/1.1; 709/223; 709/224; 709/225; 709/226; 399/8; 399/9; 399/24; 714/47.1; 714/47.2; 714/47.3

(58) Field of Classification Search
USPC ................................. 358/1.14, 1.15
See application file for complete search history.

(56) References Cited

U.S. PATENT DOCUMENTS

| 5,305,199 | A | * | 4/1994 | LoBiondo et al. | ............... 705/28 |
| H1743 | H | * | 8/1998 | Graves et al. | ................. 700/236 |
| 6,430,711 | B1 | * | 8/2002 | Sekizawa | ..................... 714/47.2 |
| 6,510,292 | B1 | * | 1/2003 | Owen et al. | ...................... 399/27 |
| 6,938,976 | B2 | | 9/2005 | Siwinski et al. | |
| 7,069,294 | B2 | * | 6/2006 | Clough et al. | ................. 709/203 |
| 7,584,273 | B2 | * | 9/2009 | Shibata | ......................... 709/223 |
| 2002/0073002 | A1 | | 6/2002 | Horii et al. | |
| 2002/0126164 | A1 | | 9/2002 | Walker et al. | |
| 2002/0163662 | A1 | * | 11/2002 | Kaufman et al. | ............ 358/1.14 |
| 2003/0025743 | A1 | | 2/2003 | Maeda | |
| 2003/0043401 | A1 | | 3/2003 | Abel et al. | |
| 2003/0071862 | A1 | | 4/2003 | Tsukada et al. | |
| 2003/0222934 | A1 | | 12/2003 | Choi et al. | |
| 2004/0196331 | A1 | | 10/2004 | Zerza et al. | |
| 2004/0196479 | A1 | | 10/2004 | Foster et al. | |
| 2004/0204977 | A1 | * | 10/2004 | Obert | ................. 705/8 |
| 2004/0217994 | A1 | | 11/2004 | Otis, Jr. | |
| 2005/0140705 | A1 | | 6/2005 | Godil et al. | |
| 2007/0183807 | A1 | * | 8/2007 | Park et al. | ......................... 399/88 |

FOREIGN PATENT DOCUMENTS

| EP | 0 779 156 B1 | 9/2001 |
| EP | 1 281 524 A2 | 2/2003 |
| EP | 0 924 083 B1 | 7/2003 |
| EP | 0 882 595 B1 | 11/2003 |
| EP | 1 366 899 A2 | 12/2003 |

* cited by examiner

Primary Examiner — Hilina K Demeter

(57) ABSTRACT

A system for monitoring consumable supply levels in one or more printers includes a printer server for periodically polling the one or more printers for an indication of a supply level of one or more consumables in each printer. The printer server comprises a polling algorithm that dynamically adjusts a polling rate at which the one or more printers are polled. A method of monitoring consumable supply levels in one or more printers includes periodically polling the one or more printers for an indication of a supply level of one or more consumables in each printer; and automatically adjusting a polling rate at which the one or more printers are polled.

7 Claims, 3 Drawing Sheets

SYSTEMS AND METHOD FOR MONITORING CONSUMABLE SUPPLY LEVELS IN ONE OR MORE PRINTERS

BACKGROUND

In many enterprises, a significant number of printers may be provided and used for producing hardcopy documents. Typically, these printers are connected to a network that also connects to a variety of printer clients that may need to submit a print job to a printer. In this way, a particular printer can be shared by a number of users to maximize the value of that printer. Additionally, a number of different types of printers can be made available to the users of the network. Another advantage of using printers through a network is that a user can select a different printer if the printer closest to that user is unduly busy serving other users.

With such a distributed printing environment, it can become difficult to ensure that each printer is adequately supplied with consumables such as paper and toner or ink. In some enterprises, the various printer units may experience particularly heavy usage making it even more difficult to keep the printers supplied with consumables. Additionally, the more widely distributed the physical locations of the printers on the network, the more difficult it will be to keep the printers supplied with consumables.

BRIEF DESCRIPTION OF THE DRAWINGS

The accompanying drawings illustrate various embodiments or examples of the principles described herein and are a part of the specification. The illustrated embodiments are merely examples of the present invention and do not limit the scope of the claims.

Throughout the drawings, identical reference numbers designate similar, but not necessarily identical, elements.

DETAILED DESCRIPTION

As will be described in the following specification, a printer server polls a population of printers on a network for current supply levels of consumables installed in and used by those printers. When a supply level reaches a minimum warning threshold or a predicted consumable exhaustion time, an alert is issued by the printer server to have the printer re-supplied. The polling of each printer is dynamic and occurs at a variable rate or interval. If a printer is consuming a supply of a consumable at a rate that outpaces a historic rate for that printer, the polling interval for that printer for that consumable will be decreased. Additionally or alternatively, if the supply of a consumable in a printer is approaching a minimum warning threshold, the polling interval for that printer for that consumable will be decreased. When a printer is re-supplied with a particular consumable, the polling interval for that printer for that consumable is increased or reset to a starting value.

In this way, network traffic in support of the printer polling function is minimized. Consequently, a much greater number of printers can be networked and monitored for consumable usage than has been possible in previous solutions.

As used herein and in the appended claims, the term "consumable" will be understood to anything that is used or consumed by a printer in producing a hardcopy document. Consequently, consumables will include, but are not limited to, paper or other print media, toner, ink, etc.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

Figure 1:
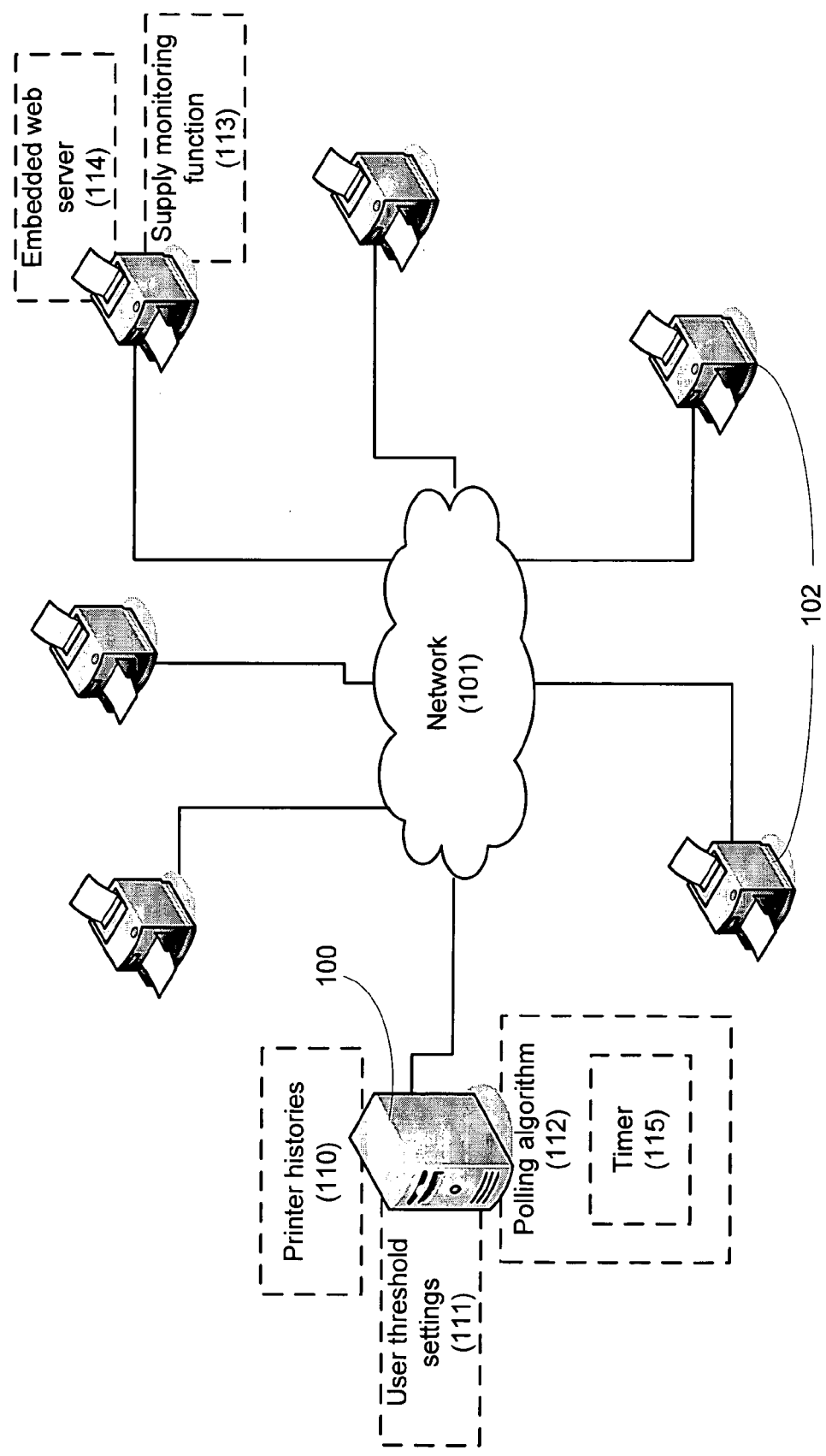
FIG. 1 illustrates an exemplary network with a printer server and printers according to principles described herein.

FIG. 1 illustrates an exemplary network including a printer server and printers that are arranged and operate according to principles described herein. As shown in FIG. 1, a number of monitored printers (102) are connected to a network (101). It will be understood by those skilled in the art that the network (101) represents any type or combination of electronic or optical data networks without limitation. For example, the network (101) may be a Local Area Network (LAN), a Wide Area Network (WAN) or a global network, such as the Internet. Moreover, the network (101) may include two or more different types of networks or two or more separately-operated networks.

A printer server (100) is also connected to the network (101). The printer server (100) is tasked with monitoring the consumption of consumable supplies, such as paper and toner or ink, among the population of printers (102). As described above, the printer server (100) periodically polls each of the printers (102) using the network (101) for an indication of a quantity of each of a number of different types of consumables available at that printer (102).

Each printer (102) will include a supply monitoring function (113). This supply monitoring function (113) may include both hardware and/or firmware that enable the printer (102) to assess and quantify a supply of a consumable that is available in or to that printer.

The supply monitoring function (113) may include subsystems for monitoring a number of different types of consumables used by the printer. For example, the printer (102) may have a system that is part of the supply monitoring function (113) that assesses and quantifies how much paper or other print medium the printer (102) has available. In another example, the printer (102) may have a system that is part of the supply monitoring function (113) that assesses and quantifies how much ink or toner the printer (102) has remaining.

Recent printer models have included an embedded web server (114) as part of the printer firmware. This web server (114) allows the printer (102), once connected to a network, to receive data and to generate and transmit data in the form of, for example, a web page. In some embodiments, the web page produced by the embedded web server (114) may be produced using Hyper-Text Markup Language (HTML) and transmitted using Transmission Control Protocol/Internet Protocol (TCP/IP).

In some embodiments, the supply monitoring function (113) cooperates with, or is incorporated in, an agent application, for example, the embedded web server (114). In such embodiments, data on available consumable supply levels, as determined by the supply monitoring function (113), can be transmitted by the agent application via the network (101), to the printer server (100). Typically, this will occur in response to a poll initiated by the printer server (100), but this is not necessarily so.

The printer server (100) has resident thereon and executes a polling algorithm (112). This polling algorithm (112) will determine the appropriate interval at which to poll each printer (102) for its supply of a particular consumable based on several factors as described herein.

The polling algorithm (112) conducts the polling at the determined dynamic interval to minimize the demands of the polling process on the network without sacrificing the ability of the polling process to provide timely alerts that a particular printer (102) needs to be re-supplied with a particular consumable. In some examples, the polling algorithm (112) can determine and use a different polling interval for each printer (102) and for each consumable used by each printer (102).

The polling algorithm (112) also includes a timer (115). The timer (115) may be used to associate a time with each poll and the data obtained from a printer (102) as a result of that poll. The timer (115) is used to determine the amount of time that has elapsed between successive polls. By measuring the elapsed time and noting the change in the level of the consumable between the successive polls, the rate at which a printer consumable is being used up can be determined.

Additionally, the printer server (101) may maintain a separate printer history (110) for each printer (102) on the network (101). In some embodiments, the printer history (110) will include at least two pieces of information for each printer: (1) an indication of a supply level of a consumable at that printer as reported when the printer was most recently polled; and (2) a rate at which that printer has historically consumed that particular consumable. The printer history (110) for a particular printer may cover only the time during which the printer in question has been operating on the network (101) or could include data transferred with the printer (102) when the printer (102) was first connected to the network (101).

The polling algorithm (112) can use the historical consumption rate for a given printer (102) and a particular consumable to assess the current rate at which that printer (102) is using that consumable. The current consumption rate may be determined in any of a number of ways. For example, the current rate of consumption may be measured by the timer and two or more succeeding polls. Alternatively, the current consumption rate could be reported by a system monitoring the use of the consumable in the printer or inferred from other data. As will be described below, this comparison of current consumption rate with the historical rate may determine whether there is any adjustment in the rate at which that printer (102) is subsequently polled.

The printer server (100) will also store user threshold settings (111). These settings determine when an alert is issued by the printer server (100) that a printer (102) is in need of a re-supply of a particular consumable. In some embodiments, the threshold settings (111) may be stated as percentages that quantify the remaining consumable supply as compared to a maximum amount of that consumable that could be accommodated in a printer (102). In such embodiments, the user threshold settings (111) can vary from 0-100% as desired by the user. In other embodiments, the threshold settings (111) may be stated as predicted amounts of time before the consumable is exhausted or empty.

If a poll conducted by the polling algorithm (112) indicates that a supply of a particular consumable is at or below the threshold set for that consumable on that printer (102), an alert to re-supply that printer (102) is issued by the printer server (100). The alert can be in any of a variety of forms, for example, an email, a pop-up, a visible display, an audible alert, a text message sent to a mobile phone, personal digital assistant or pager, etc. The alert is typically sent to a system operator or other responsible person who, upon receiving the alert, will see that the identified printer is re-supplied with the diminishing consumable.

According to principles disclosed herein, the user can freely establish as many independent thresholds (111) as desired. For example, the user may establish the same warning threshold for all printers (102) with respect to a particular type of consumable. Alternatively, the user may establish different warning thresholds for the same type of consumable in different printers (102). This may be useful if some printers (102) tend to go through a consumable more rapidly or more slowly that other printers on the network (101). In some embodiments, the warning threshold for each consumable on each printer (102) may be independent specified by the user. In other embodiments, the user may establish printer groupings including one or more specified printers to which one or more warning threshold settings will apply.

Figure 2:
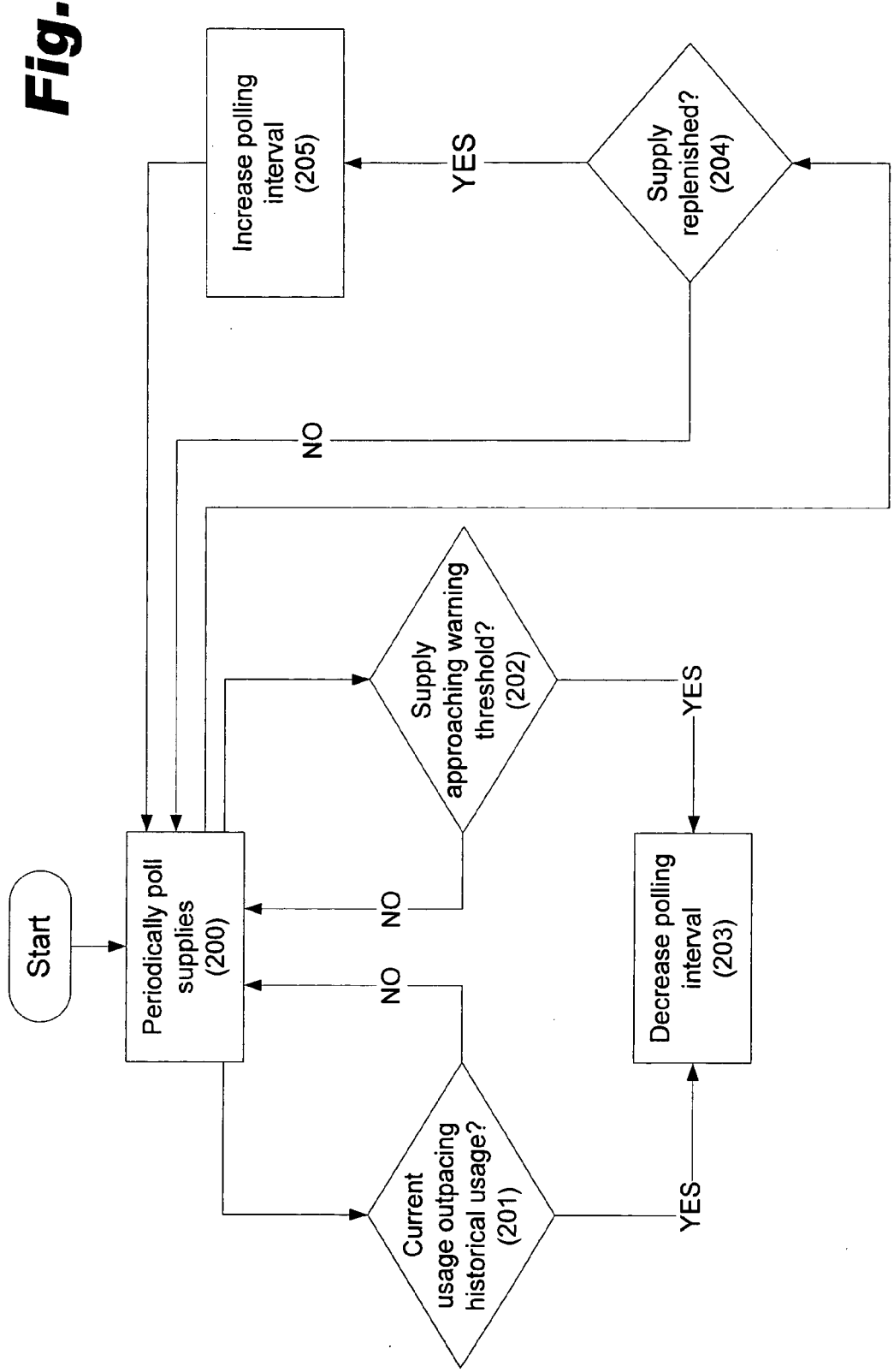
FIG. 2 is a flowchart illustrated an exemplary method of monitoring printer for adequate consumable supplies according to principles described herein.

FIG. 2 is a flowchart illustrated an exemplary method of monitoring printer for adequate consumable supplies according to principles described herein. As shown in FIG. 2, and as described above, the printer server (100) will periodically poll the printers (102) to determine the supply of various consumables remaining in each printer. (Step 200). Under the principles described herein, the rate at which this polling occurs can dynamically change over time such that network traffic due the polling is minimized without compromising the ability to issue timely alerts when a printer (102) is in need of re-supply of a particular consumable.

There are at least two factors that might cause the system to increase the polling rate, that is, decrease the time between two polls to a particular printer regarding the same one or more consumables. As shown in FIG. 2, the current usage by a printer of a consumable may outpace historical usage (determination 201) or the supply of a consumable in a printer may have dwindled to near a warning threshold.

As described above, the polling algorithm (113) will have access to printer histories (110) that allow the algorithm (113) to compare the current rate at which a printer is using a consumable with a rate at which that printer has historically consumed that consumable. If the current usage by that printer of that consumable exceeds historical usage by that printer of that consumable (determination 201), the rate at which the polling algorithm (113) polls that printer for levels of that consumable will be increased (step 203). If the printer is going through a consumable more rapidly that it has previously, it is worth checking more frequently to determine if the printer is in need of re-supply of that consumable.

Similarly, if the supply of a consumable remaining in a printer is approaching a warning threshold (determination 202), the interval at which the polling algorithm (113) polls that printer for levels of that consumable will be decreased (step 203), i.e., the polling rate is increased. If the printer is close to a threshold at which the user has indicated an alert for re-supply should be issued, it is worth checking more frequently to determine if the printer has reached that threshold so that the alert can be timely issued.

The server (100) may have a pre-determined limit that specifies when the level of a consumable supply is close enough to the user-set warning threshold that an increase in the polling rate is made. Alternatively, the user or operator of the server (100) may be allowed to input a limit at which the level of a consumable supply is close enough to the user-set threshold that an increase in the polling rate is made. In still another alternative, the limit may be calculated by the server (100) based an estimated amount of time until the consumable supply is exhausted or based on how long it typically takes for the consumable supply to be replenished. Additionally, there may be a number of such successive limits, whether pre-set, calculated or user-determined, with the polling rate being increased as each successive limit is reached approaching the warning threshold where the re-supply alert is issued.

At some point, the supply of the consumable in the printer will be replenished (determination 204). This may be in response to an alert as described herein, but this is not necessarily so. A user may add to the supply of a consumable before a re-supply alert is issued or even before the consumable runs low.

When re-supply of a consumable occurs, the fact that the printer consumable has been replenished will be determined, for example, by the supply monitoring function (113). The printer server (100) is accordingly notified that the re-supply has occurred. Alternatively, the printer server (100) may be advised that the re-supply has occurred when the server (100) conducts the next poll for that printer for that consumable and finds that the supply has been replenished.

When the supply of the consumable in the printer is replenished (determination 204), the polling algorithm (112) can then decrease the polling rate or increase the polling interval (step 205). Upon re-supply (determination 204), the polling rate associated with the printer and consumable replenished can be reset to a starting value. Alternatively, the polling rate can be decreased in proportion to an amount of consumable added to the printer or a percentage of total consumable supplied as compared to the maximum amount of that consumable the printer can contain.

Figure 3:
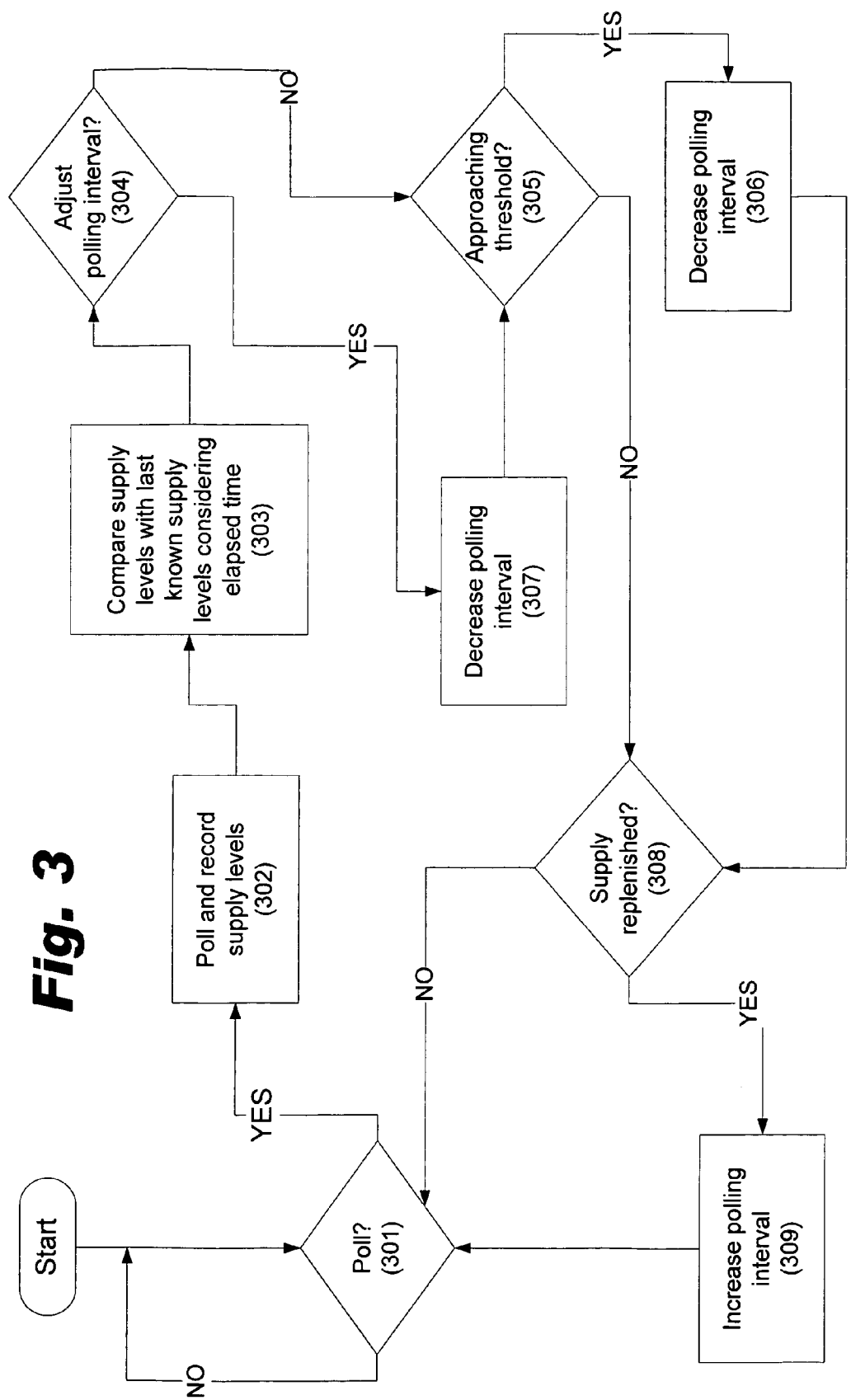
FIG. 3 is a flowchart illustrated another exemplary method of monitoring printer for adequate consumable supplies according to principles described herein.

FIG. 3 is a flowchart illustrating another exemplary method of monitoring a printer or printers for adequate consumable supplies or for an estimated time until a consumable needs to be re-supplied, according to principles described herein. As shown in FIG. 3, the polling algorithm (112) will periodically conduct a poll. This poll will occur on a periodic basis, the period of which is determined by the factors explained above, including, but not limited to, when the printer is re-supplied with a consumable, whether the printer is exhausting a consumable more rapidly than it has historically and whether the supply of a consumable in a printer is approach a low warning threshold.

As will be appreciated by those skilled in the art, the polling algorithm (112) may conduct a poll that is applicable to, and responded to, by multiple printers or the polling algorithm (112) may conduct a poll that is specific and addressed to a particular printer or even specific to a particular consumable level within a particular printer. Consequently, the polling algorithm may simultaneously track and adjust any number of different polling rates that apply respectively to particular printers or particular consumable supplies at particular printers.

When it is time for any given poll to be conducted (determination 301), the poll is issued by the polling algorithm (112) and the results of the poll are received from the corresponding printer or printers (step 302). The consumable level or levels reported as a result of the poll are recorded in the printer histories (110). (Step 302). In this way, the polling algorithm (112) can compare the historical usage rate of a consumable to a current usage rate as described above.

Additionally, the historical average rate at which a printer uses a consumable can be dynamically updated each time the printer is polled for a current supply level of that consumable. As described above, the polling algorithm (112) uses the timer (115) to determine a current usage rate for a consumable between successive polls. The currently reported supply level of a consumable is compared with a last known supply level at that printer as recorded in the printer histories (110) considering the time elapsed between the current poll and the previous poll that provided the last known supply level. (Step 303).

If the current usage rate is determined to be above the historical average usage rate, the polling interval may be adjusted (step 304). For example, there may be a variance such that if the current usage rate exceeds the historical average by the established variance or more, the polling rate is increased, i.e., the polling interval is decreased (step 307). This variance may be established by the manufacturer or system user, or calculated by the server based on the estimated time until the consumable is fully depleted.

The current supply level of a consumable as reported in response to a poll is also compared to a user-established warning threshold. If the current supply level is approaching the warning threshold (determination 305), the polling rate is increased, i.e., the polling interval is decreased (step 306). As described above, whether the current supply level is approaching the warning threshold may be determined by one or more limits set by the manufacturer or user, or calculated by the server, under which limit the current supply level is considered as approaching the warning threshold and the polling rate is accordingly increased.

Eventually, the supply of the consumable will be replenished in any particular printer. When this occurs, the re-supply will be reported to the polling algorithm (112). The polling algorithm (112) may be alerted to the re-supply as soon as the re-supply occurs by the supply monitoring function (113) at the re-supplied printer. Alternatively, the polling algorithm (112) may learn of the re-supply the next time the re-supplied printer is polled for a current supply level of that consumable.

If the supply has been replenished (determination 308), the polling rate is decreased, i.e., the polling interval is increased (step 309). The polling rate may be set to a predetermined maximum or starting value or may be adjusted, such as by calculation of the server, in proportion to an amount of consumable added to the printer during the re-supply.

This methods and systems described herein provide a scalable solution that can be applied to a large number of monitored printers. The solution calculates how often a printer should be polled for supply levels based on one or more user-defined threshold levels, the historical duty cycle of a supply, and the current rate of usage for that particular supply. As described herein, this is a reactive solution that polls the printer at an increasing rate as the supply level approaches a warning threshold. This solution can accurately detect when a supply is replenished as well, due to the knowledge of historical supply levels and usage rates.

Thus, as described herein, the polling interval will increase or decrease based on the supply of consumable and/or rate of consumption for that consumable. In this way, the polling burden on the network is minimized without incurring greater risk that a consumable will be exhausted without warning. In some examples, the polling interval will be calculated as one half the estimated time to the next threshold of interest at the current consumption rate up to a specified maximum.

The preceding description has been presented only to illustrate and describe embodiments of the invention. It is not intended to be exhaustive or to limit the invention to any precise form disclosed. Many modifications and variations are possible in light of the above teaching.

What is claimed is:

1. A system for monitoring consumable supply levels in one or more printers, said system comprising:
   a printer server for periodically polling said one or more printers for an indication of a supply level of one or more consumables in each printer;
   wherein said printer server comprises a polling algorithm that dynamically adjusts a polling rate at which said one or more printers are polled; and
   wherein said polling algorithm increases said polling rate if a polled printer is approaching a warning threshold level for a consumable.

2. The system of claim 1, wherein said polling algorithm calculates an estimated time until a warning threshold level for a consumable is reached.

3. The system of claim 1, wherein said warning threshold level is set by a user of said server.

4. The system of claim 1, wherein said polling algorithm decreases said polling rate for a printer when that printer is re-supplied with a consumable.

5. A system for monitoring consumable supply levels in one or more printers, said system comprising:
   a printer server for periodically polling said one or more printers for an indication of a supply level of one or more consumables in each printer;
   wherein said printer server comprises a polling algorithm that dynamically adjusts a polling rate at which said one or more printers are polled; and
   wherein said polling algorithm increases said polling rate if a polled printer is using a consumable at a rate that exceeds a historical rate at which that printer has used that consumable.

6. The system of claim 5, wherein said polling algorithm increases said polling rate if said polled printer is using said consumable at a rate that exceeds said historical rate at which that printer has used that consumable by more than a predetermined variance.

7. The system of claim 5, wherein said polling algorithm decreases said polling rate if said polled printer is using said consumable at a rate that is less than said historical rate at which that printer has used that consumable by more than a predetermined variance.

* * * * *